(12) United States Patent
Taguchi et al.

(10) Patent No.: US 12,178,220 B2
(45) Date of Patent: Dec. 31, 2024

(54) METHOD AND SYSTEM OF MAKING A SHORTCAKE IN A PACKAGE CONTAINER

(71) Applicant: TAGUCHI & CO., LTD., Hyogo (JP)

(72) Inventors: Haruki Taguchi, Hyogo (JP); Shoichi Taguchi, Hyogo (JP)

(73) Assignee: TAGUCHI & CO., LTD., Hyogo (JP)

( * ) Notice: Subject to any disclaimer, the term of this patent is extended or adjusted under 35 U.S.C. 154(b) by 442 days.

(21) Appl. No.: 17/224,237

(22) Filed: Apr. 7, 2021

(65) Prior Publication Data

US 2022/0046945 A1 Feb. 17, 2022

(30) Foreign Application Priority Data

Aug. 17, 2020 (JP) .................................. 2020-137263

(51) Int. Cl.
  *A23G 3/02* (2006.01)
  *A21D 13/17* (2017.01)
  *A21D 13/19* (2017.01)
  *B65B 3/00* (2006.01)
  *B65B 7/28* (2006.01)

(52) U.S. Cl.
  CPC ........... *A23G 3/0257* (2013.01); *A21D 13/17* (2017.01); *A21D 13/19* (2017.01); *A23G 3/0273* (2013.01); *A23G 3/0278* (2013.01); *B65B 3/00* (2013.01); *B65B 7/28* (2013.01)

(58) Field of Classification Search
None
See application file for complete search history.

(56) References Cited

U.S. PATENT DOCUMENTS

| | | | | |
|---|---|---|---|---|
| 5,752,649 A | * | 5/1998 | Weder | B65D 5/36 47/72 |
| 2003/0215554 A1 | * | 11/2003 | McCarrick | A21D 13/14 426/549 |
| 2014/0183198 A1 | * | 7/2014 | Slack | B65D 51/18 493/93 |

FOREIGN PATENT DOCUMENTS

| | | |
|---|---|---|
| JP | S58-60946 A | 4/1983 |
| JP | H05-23882 U | 3/1993 |
| JP | 2015-110444 A | 6/2015 |
| JP | 2015-142527 A | 8/2015 |
| JP | 2020-171219 A | 10/2020 |

(Continued)

OTHER PUBLICATIONS

Berry Chantilly Cake, Mar. 24, 2019.*

(Continued)

*Primary Examiner* — Lien T Tran
(74) *Attorney, Agent, or Firm* — IP Business Solutions, LLC

(57) ABSTRACT

A system for manufacturing a multi-layer shortcake can be realized by reversing the manufacturing process of the shortcake to normal. The assembly line conveyor system includes a package container having a top opening as a cake mold and a take-out film set as an insole in the package container. The packaged shortcake includes a topping layer of a cake, a first cream layer, a shape retaining sponge block, a second cream layer, and a cake base platform on the insole film and closed with a bottom lid. Preferably, the packaged shortcake contains a cake block between the first cream layer and the second cream layer for supporting the shape of the shortcake.

9 Claims, 15 Drawing Sheets
(6 of 15 Drawing Sheet(s) Filed in Color)

(56) References Cited

FOREIGN PATENT DOCUMENTS

WO     2006/025132 A1    3/2006

OTHER PUBLICATIONS

Woman's Day Kitchen, " Coffee Terrine", Aug. 29, 2013.*
David Lebovitz, "upside down cake recipe", Jul. 22, 2008.*
Japanese Office Action issued on Dec. 5, 2022 in corresponding Japanese patent application No. 2021-549610.

* cited by examiner

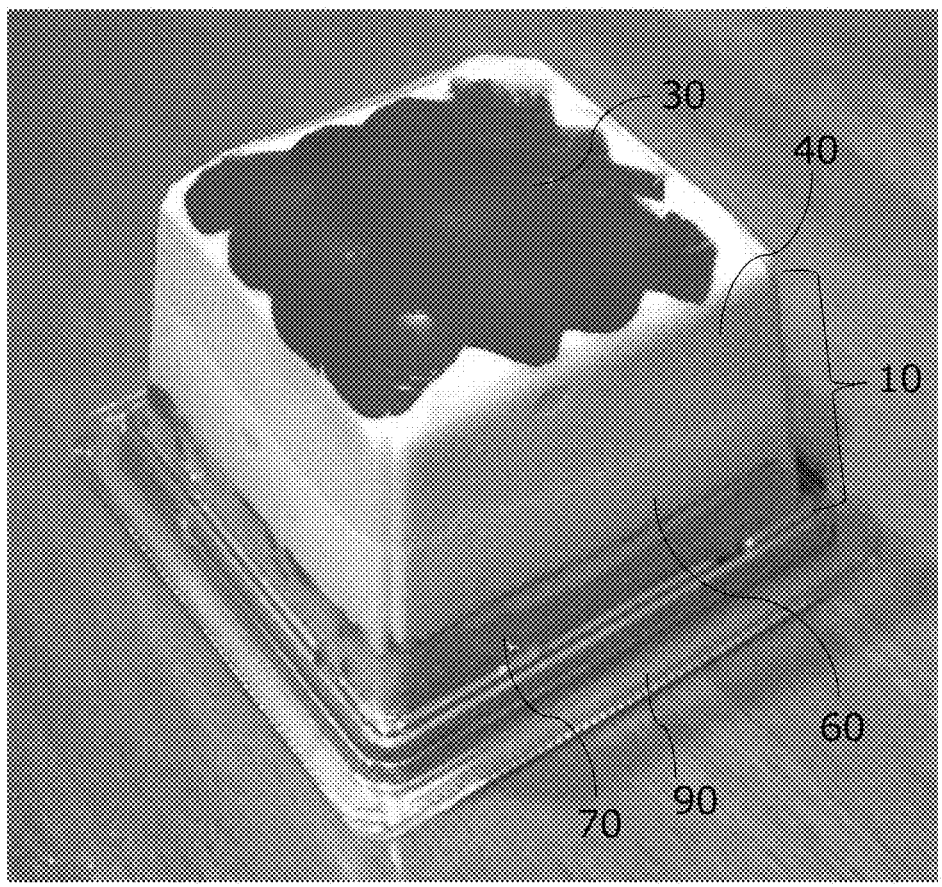
Fig.6( c )

METHOD AND SYSTEM OF MAKING A SHORTCAKE IN A PACKAGE CONTAINER

CROSS-REFERENCE TO RELATED APPLICATIONS

The present application claims priority under 35 U.S.C. 119 to Japanese Patent Application No. 2020-137263, filed on Aug. 17, 2020. The contents of this application are incorporated herein by reference in their entirety.

BACKGROUND OF THE INVENTION

Field of the Invention

The present invention relates to a method for making a shortcake within a mold of package container, which is suitable for mass-production of a packaged shortcake provided with a property hard to collapse during delivery, and also relates to an assembly line conveyor system for carrying out the method of the mass-production. More particularly, a method and a system for producing a new packaged shortcake (including an ice cream cake) which is made within a mold of the package container by processes reverse to normal and able to provide a shortcake decorated by a large amount (about twice volume of the conventional one) and multi-layers of cream on a sponge cake or pancake.

Description of the Related Art

If the shortcake can be available at any other market stores than a cake factory, it is very convenient for customers.

Generally, cut shortcakes are sold directly at the cake factory shop where the shortcakes are made, because the shortcakes are easy to be collapsed, so that it is difficult to deliver it to the market from the cake factory if without being packaged. It is caused by the following making process.

In the process, there has been carried out a hand-made process which comprises a step of making a whole cylindrical sponge cake and applying the cream to it. Furthermore, there is a step of cutting the creamed whole cake to a pre-determined size. In the cutting process, the operator usually uses a rotary table. That is, the whole cake is placed on the rotary turntable and the operator can cut the cake into predetermined sizes while manually rotating the cake turntable. Then, the operator separates the fan-shaped cut cake on the turntable by using a take-out fork, or the like, and transfers each of the fan-shaped cut cakes onto, for example, a belt conveyor. Then, on the belt conveyor, each of the cut cakes is wrapped at the outer peripheral side surface by a belt-shaped film. In addition, finally a decorative work for topping fruits and the like is also performed.

Therefore, in the conventional process, it is a problem to need a lot of steps. That is, the operation of separating the cut cakes on the rotating table, the operation of transferring the cut cakes onto the belt conveyor and the process of packaging the cut cake by winding of a film, are necessary, so that the operation takes much time. Furthermore, there is also required space for making the shortcake. Therefore, in order to solve such a problem, there has been an automated rotating table provided which is capable of performing various processing operations without requiring the transfer operation to a belt conveyor in the JP-A-2015-142527

SUMMARY OF THE INVENTION

However, in the preparation of a shortcake using such a cake manufacturing turntable, the whole cake cutting process, the transfer process to a belt conveyor, and the packaging process are indispensable, so that there is a difficulty to sell them in any other place than the cake factory. In other words, under the current situation since many market stores want to sell the shortcakes and every customer wants to buy the shortcake at other market stores than the cake factory, it is necessary to make a shortcake provided with a property hard to collapse during the delivery of shortcake from the cake factory site to the market stores. As described above, it is difficult to sell the shortcake at the store far from the cake factory. This is because the shortcake formed by cutting the whole cake, is liable to be damaged by a slight impact, so that it is difficult to deliver the shortcake as it is to a sales place such as a remote store from the cake factory. In the other words, the shortcake invention mentioned here is the one which must be sold at the stores from the cake factory. In view of the fact that many customers desire to purchase the shortcake in the current market store in recent years, it is therefore the objective of the present invention to provide a shortcake which can be delivered to a market store remote from the cake factory without breaking down of the cake, and so the customer can purchase the shortcake at the usual market, take it out home, and easily unpackage it at home and eat it.

Accordingly, it is also another objective of the present invention to provide a method of making or manufacturing the same.

Usually, a shortcake used to be made with easily broken property during delivery, from the following processes, baking out of a sponge cake, creaming on the outside, topping with fruit, etc., and then dividing and packaging, and then being sold. The inventors have taken the point to be solved into consideration and completed the present invention by noting that, if the shortcake can be produced with hardly broken properties during delivery, it becomes possible to be sold in a market store other than the cake shop or cake factory. At this point, the inventors tried to reverse the manufacturing process of the shortcake and produced newly packaged shortcake. In other words, the present invention has been completed by utilizing a combination of a package container and a taking out insole sheet as a manufacturing mold to reverse the shortcake total processes from the head to the base.

That is, the present invention is a method for making a shortcake having a structure formed by stacking at least two cream layers on a sponge cake or pancake, comprising the steps of:
1) Supplying a package container 10 having an opening at the top and tapered side walls outwardly in an upward direction;
2) Setting the insole film 20 to cover an inner bottom surface and at least a pair of inner opposing side walls of the package container, the ends of which being taken out from the package opening;
3) Forming a topping layer 30 of the shortcake on the insole film covered on the inner bottom surface of the package container;
4) Forming a first cream layer 40 on the topping layer 30 in a manner to cover the topping layer and be spread over the inner bottom area of the package container;
5) Placing a second cake block 50 having a smaller area than that of the first cream layer 40 in a manner to be attached on the first cream layer 40;
6) Forming a second cream layer 60 on the cake block 50 to cover and sandwich the cake block 50 with the first cream 40 and the second cream layer 60;

7) Placing a cake platform on the second cream layer 60 in a manner to cover all of the second cream layer 60, and 8) Finally fitting a bottom lid 90 into an opening of the package container 10 in a manner to support all of the shortcake.

In the method of the present invention, it is also possible to make topping of some fruits directly as the topping layer, or to make topping of the fruits together with the fruit source, as may be appropriate. A fruit sauce layer or puddle 80 may also be provided between the second cream layer and the base platform.

In other words, a first feature of the method of the present invention is that a package container 10 is used as a mold for making the shortcake, and a plurality of shortcake layers 30, 40, 50, 60, 70 are sequentially constructed, in which at least the same kind or different kinds of cream layers are stacked in a package container in a reverse process. When a shortcake is produced in the reverse process, the removal of the shortcake from the package container becomes a problem. To solve this problem, the top-open package container 10 has a structure that is formed by outwardly open tapered walls in an upward direction and is provided with an insole film 20 which covers the inner bottom surface and at least a pair of opposing inner sidewalls of the package container, and whose ends are taken out from the package opening. The insole film 20 may be in the form of a band-like strip (as shown in FIG. 3), but may also be in the form of a rectangular covering bag-like sheet 22 (as shown in FIG. 4) which covers the inner side of the package container. The insole film 20 is useful to avoid adhesion of the cake contents to the inside of the package container 10 and also to facilitates removal of the cake from the package container 10.

A second feature of the method of the present invention is that the cream layers are made as multilayer structures 40 and 60 as much as possible for making the shortcake luxurious. In the case of making a luxurious cake, it is necessary to stack two or more adjacent cream layers 40 and 60, but if the volume of the cream layers is increased, it becomes difficult to secure the shape retention of the shortcake. According to the present invention, it is one of the objects of the present invention to maintain the shape retaining property of the stacked cream layers by sandwiching a dough layer 50 such as a sponge cake between 2 adjacent cream layers 40 and 60. In this case, a source layer or puddle 80 of the same kind or different kind as the topping layer 30 may be provided between the second cream layer 60 and the base platform 70 to give the cake a deep taste. As a result, in the packaging container according to the present process, there can be reversely produced a Mont Blanc-type rectangular shortcake having a total volume of 300 to 500 $cm^3$ with a source and cream capacity of approximately twice of sponge capacity, which include 30 to 40 ml of the topping source layer of the first layer 30; 100 to 120 ml of the whipping cream layer of the second layer 40; 50 to 100 ml of the dough layer of the third layer 50; 50 to 100 ml of the custard cream layer or choco cream layer of the fourth layer 60, 10 to 20 ml of the source layer of the fifth layer 80; and 80 to 100 ml of the sixth layer 70.

Then, since the third feature of the present invention is formed by filling and changing a sauce and a cream from a nozzle into a package container, it is preferable in manufacturing that the whipped cream material having a soft peak (60% whipped cream) and a specific gravity of about 1 is used. Further, the use of the intermediate shape retaining dough 50 is important, and the whipped cream layer 40 should be adjusted by mixing milk lipids of vegetables 70 to 80% with respect to animal matter 20 to 30%. Therefore, the shape of the source and cream filling nozzle may be devised by increasing the number of the nozzles in the formation of the topping source layer of the first layer, the whipping cream layer of the second layer, the custom or chocolate cream layer of the fourth layer, and the source layer of the fifth layer.

BRIEF DESCRIPTION OF THE DRAWINGS

The patent or application file contains at least one drawing executed in color, Copies of this patent or patent application publication with color drawing(s) will be provided by the Office upon request and payment of the necessary fee.

FIG. 2(*b*) is a perspective view of an outer surface of the lid.

FIG. 2(*c*) is a perspective view of the package container with an open top surface.

FIG. 2(*d*) is a X-Y cross sectional view of a top part of the package container shown in FIG. 2(*c*) with the lid shown in FIG. 2(*a*).

FIG. 3(*b*) is a view showing the removal step of the six-layer cake (1) to (3).

FIG. 4(*b*) is a view showing the removal step of the six-layer cake (1) to (3).

FIG. 5(*b*) is a cross-sectional view showing a color image of a chocolate cake of the present invention housed in a package.

FIG. 5(*c*) is a perspective view showing an actual product of a picture image of a chocolate cake of the present invention housed in a package.

FIG. 6(*b*) is a cross-sectional view showing a color image of a strawberry cake of the present invention housed in a package.

FIG. 6(*c*) is a perspective view showing an actual product of a picture image of a strawberry cake of the present invention housed in a package.

DETAILED DESCRIPTION OF THE INVENTION

Figure 1:
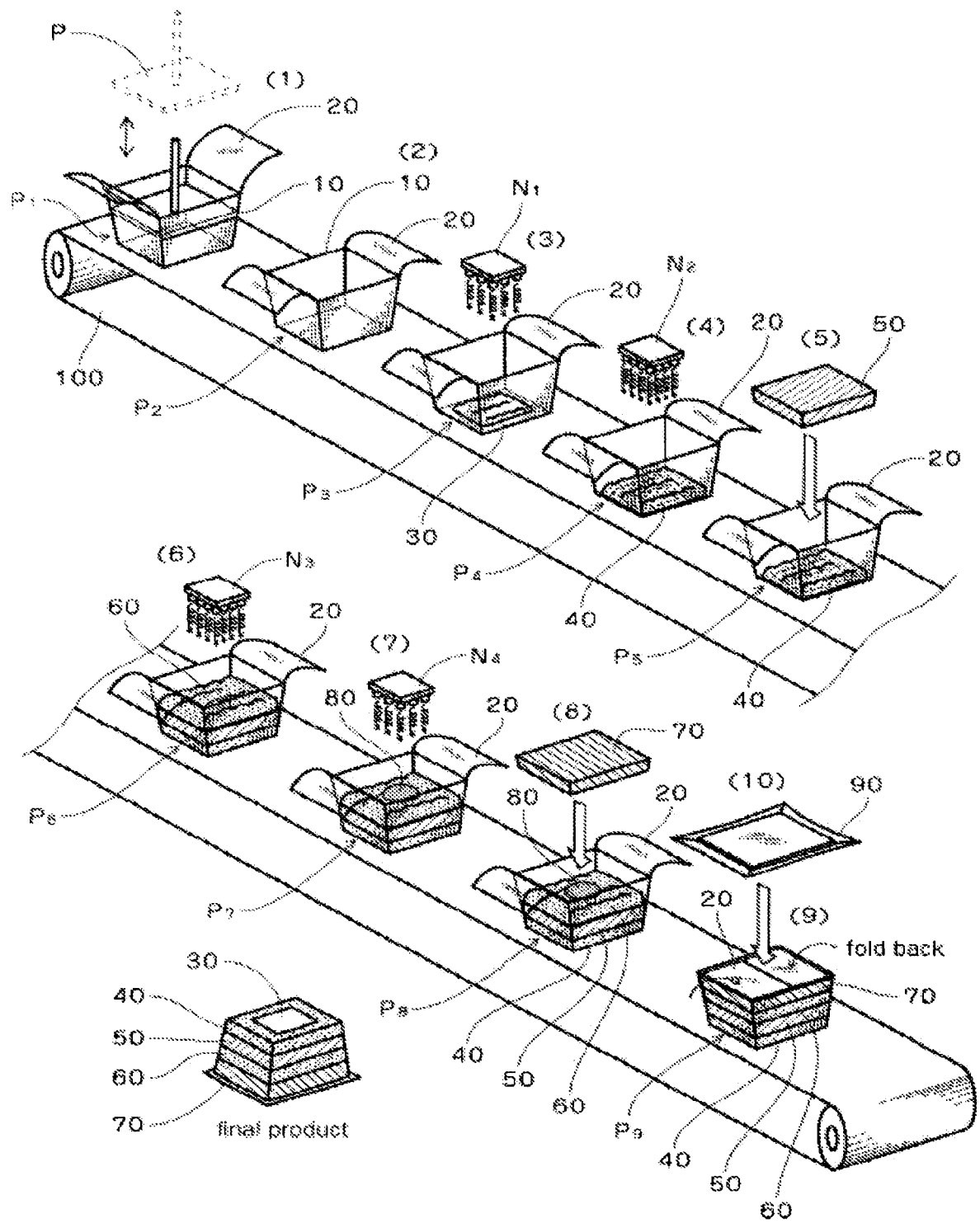
FIG. 1 is a schematic view showing the continuous steps of a method of making a shortcake from the head into a package container on a belt conveyor.
Figure 2A:
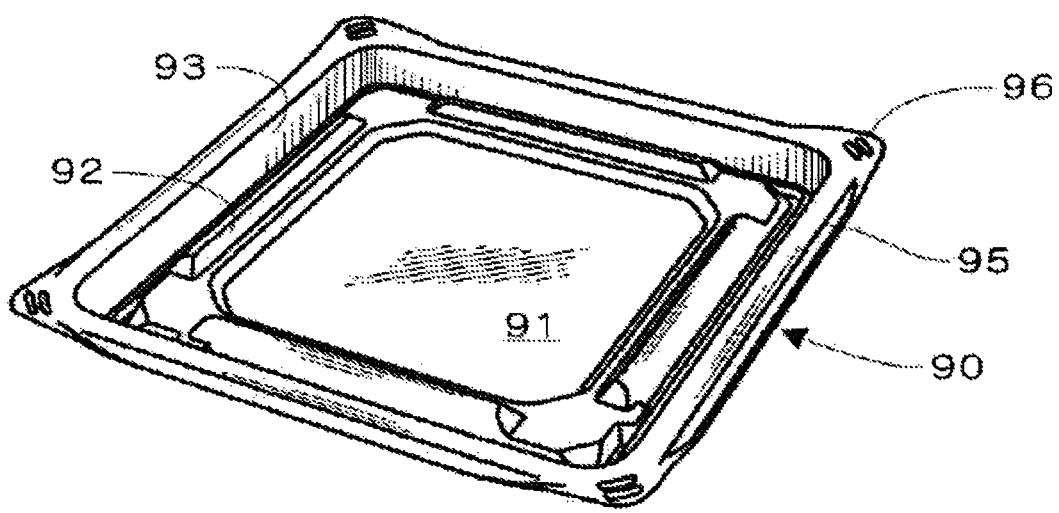
FIG. 2(*a*) is a perspective view of an inner surface of a lid body of the package container of the present invention.
Figure 2B:
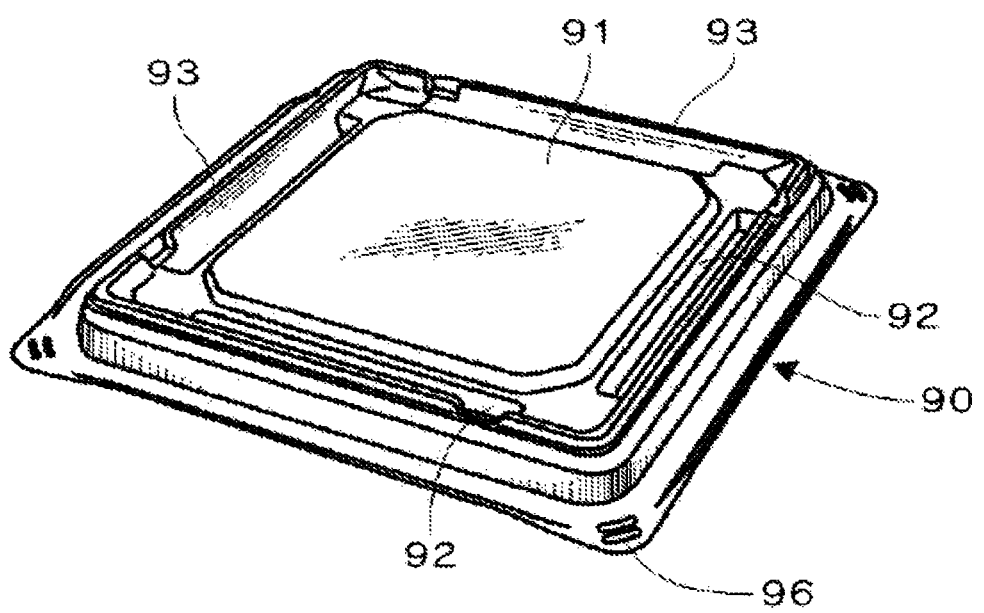
Figure 2C:
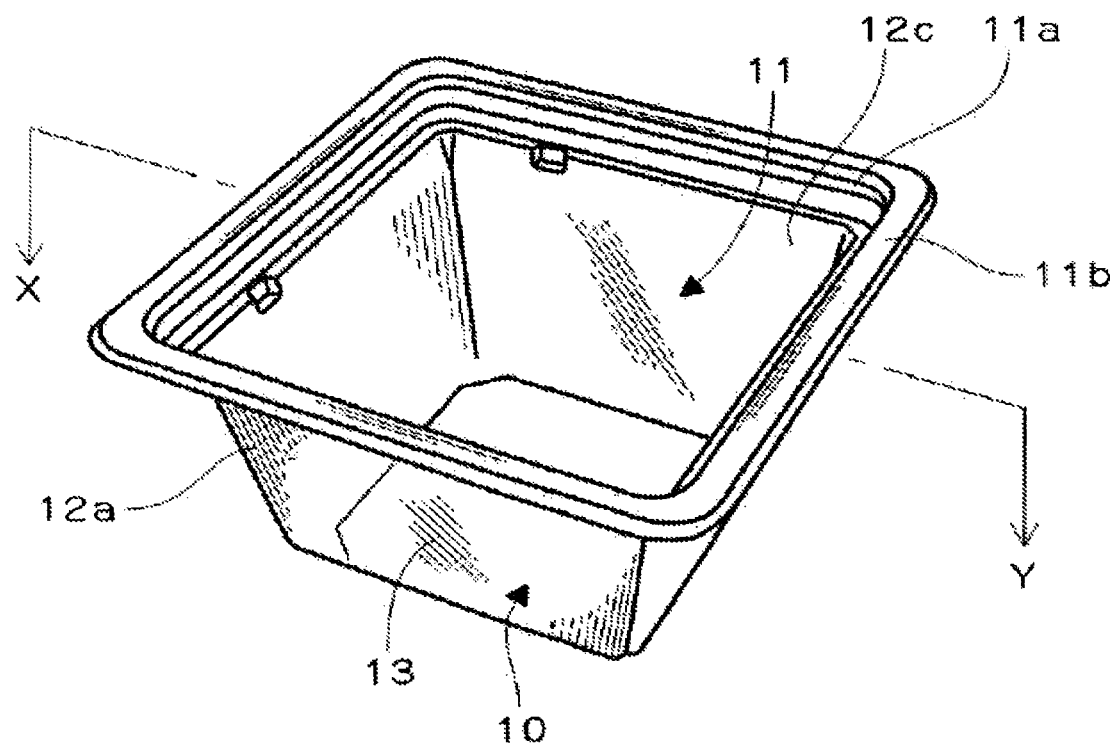
Figure 2D:
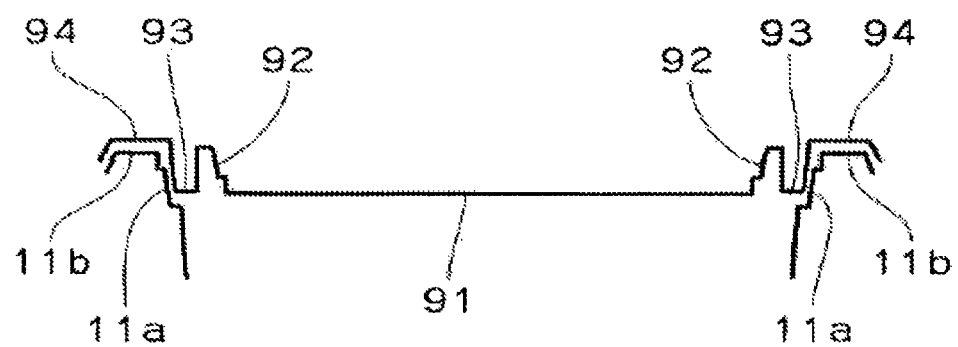

The present invention can produce the chocolate shortcake of 6-layer composition of FIG. 3 and the strawberry shortcake of 6-layer composition of FIG. 4 in the following process, as shown in FIG. 1 In other words, the present invention provides a method for producing a shortcake which is constituted by stacking at least 2 layers of cream layer on a sponge cake platform or cake base dough which comprises;

1) a process of supplying the package container 10 having the top opening as a cake manufacturing container, 2) a process of setting the take-out film 20 as an insole in the package container 10, 3) a step of forming the topping layer 30 of the cake on the insole film 20 in the package container 10, 4) a step of forming the first cream layer 40 on the topping layer 30, 5) a step of placing the shape-retaining sponge cake 50 on the first cream layer 40, 6) a step of forming the second cream layer 60 on the shape-retaining sponge cake 50, 7) a step of placing the cake base platform 70 on the second cream layer 60, 8) a step of fitting a bottom lid 90 into an opening of a package container 10.

The above steps can be realized by system which comprises the following units;

1) a unit of supplying the package container 10 having the top opening as a cake manufacturing container is positioned at the position P1 in FIG. 1, Secondly, 2) a unit of setting belt-shaped film 20 as an insole in the package container 10 is positioned at the position P2 in FIG. 1 to provide a manufacturing mold 10 provided with the inner laminated insole film 20, and then thirdly 3) a unit of forming the topping layer 30 of the cake on the insole film 20 in the package container 10 is positioned at the position P3 in FIG. 1. Further, fourthly 4) a unit of forming the first cream layer 40 on the topping layer 30 is positioned at the position P4. The first cream layer 40 is easy to collapse, so that a cake block 50 which has a smaller area than that of the first cream layer and is provided on the first cream layer for retaining a cake structure shape. Therefore, fifthly 5) a unit of placing the shape-retaining sponge cake 50 on the first cream layer 40 is positioned at the position P5 in FIG. 1. After that, sixthly 6) a unit of forming the second cream layer 60 on the shape-retaining sponge cake 50 is positioned at the position P6 in FIG. 1. At the final step, the shortcake need a platform for supporting multi-layer structure comprising the topping layer 30, 7) a unit of placing the cake base platform 70 on the second cream layer 60, the first cream layer 40, the shape-retaining sponge cake 50, and the second cream layer 60. Therefore, 8) a unit of fitting a bottom lid 90 into an opening of a package container 10 is positioned at the position P8 in FIG. 1.

When each of the above units can be constructed as an assembly line belt or roller conveyor system, the system can be useful for mass-production of the multi-layer shortcake provided with a packaged protection. Further, the above units may be operated manually by using hand nozzle or can be operated automatically by robot provided with multiple nozzles. In a preferred embodiment, there can be provided a assembly line conveyer system of mass production for producing shortcake having a structure formed by stacking at least two cream layers on a cake platform, comprised of: 1) a belt conveyor 100; 2) a unit for supplying a package container 10 having an open top surface on the belt conveyor as a cake production mold; 3) a unit for pushing a transparent film 20, 22 from a top surface opening 11 into an inside of a transported package container 10 at a first position P1 of the belt conveyor and setting the film inside the container as an insole; 4) a unit for providing a first plurality of nozzles N1 at a second position P2 downstream from the first position P1 and dropping a topping layer 30 of the cake onto an insole film 20 from an opening 11 of a top surface of the package container 10 and 5) a second plurality of nozzles N2 at a third position P3 downstream from the second position P2; 6) a unit for placing a shape retaining dough 50 on the first cream layer 40 located at a fourth position P4 downstream from the third position P3; 7) a unit for forming a third plurality of nozzles N3 on the shape retaining dough 50, at a fifth position P5 downstream from the fourth position P4; 8) a unit for placing a cake base dough 70 on the second cream layer 60 at a sixth position P6 downstream from the fifth position P5; 9) a unit for fitting a lid 90 into the opening of the package container 10. ted at a seventh position P7 downstream from the sixth position P6 or outside the belt conveyor.

Figure 5A:
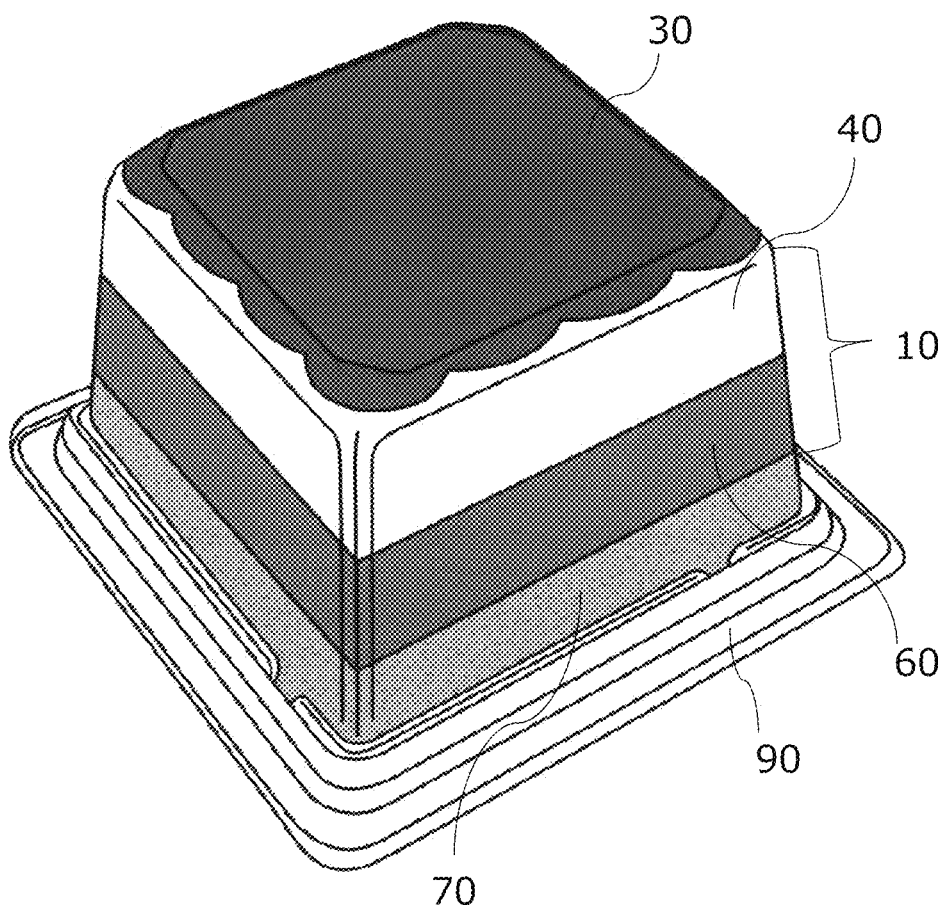
FIG. 5(*a*) is a perspective view showing a color image of a chocolate cake of the present invention housed in a package.
Figure 5B:
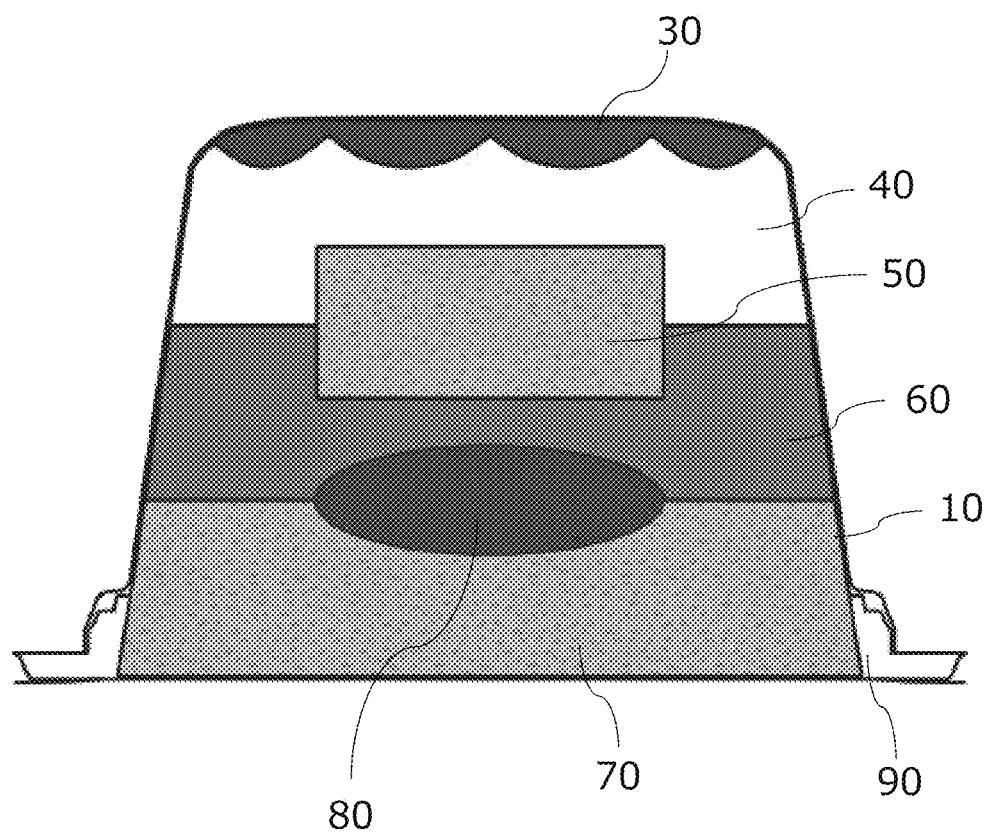
Figure 5C:
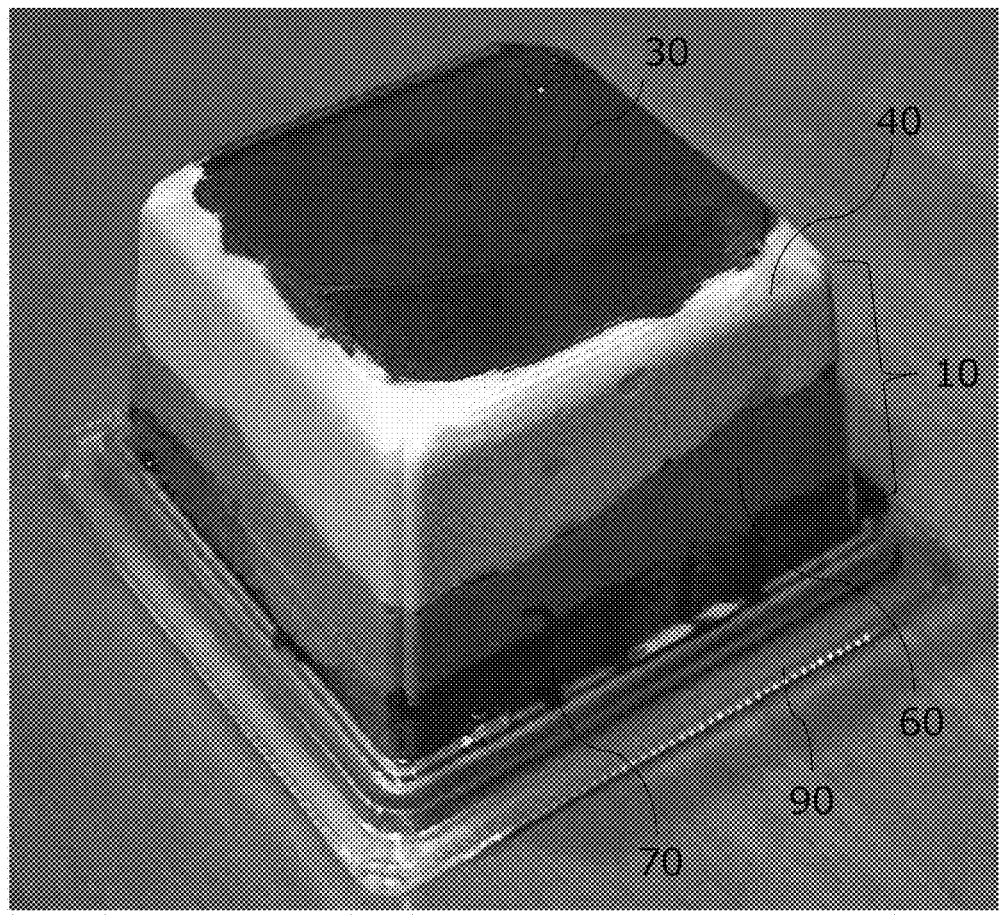
Figure 6A:
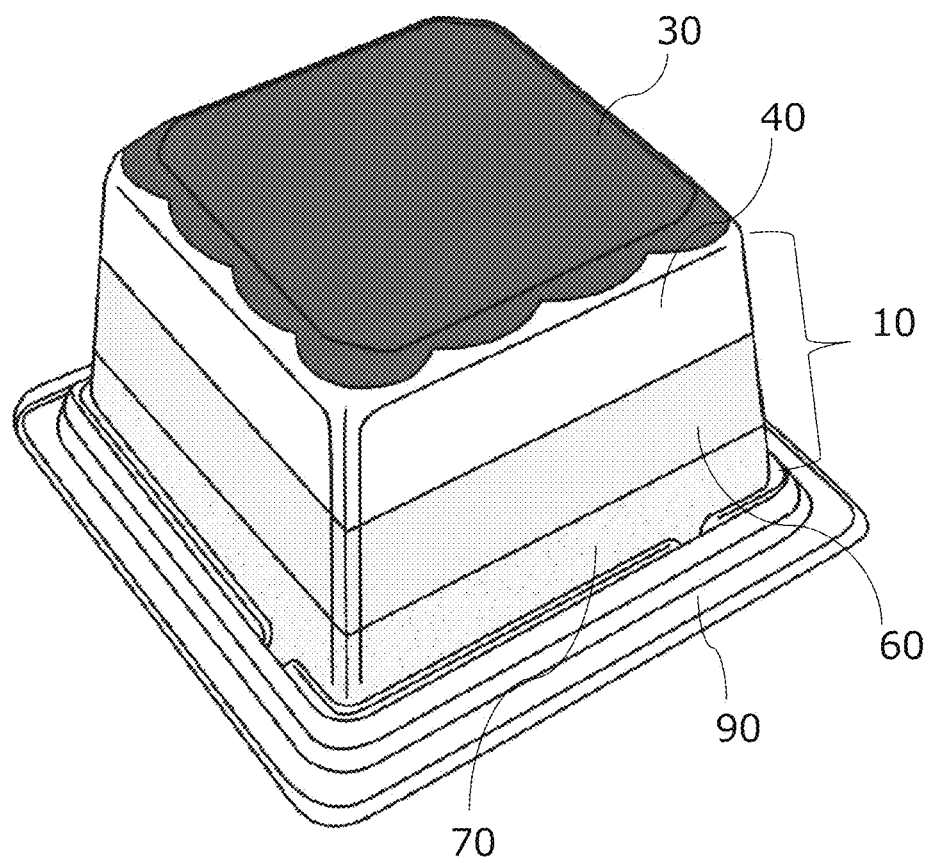
FIG. 6(*a*) is a perspective view showing a color image of a strawberry cake of the present invention housed in a package.
Figure 6B:
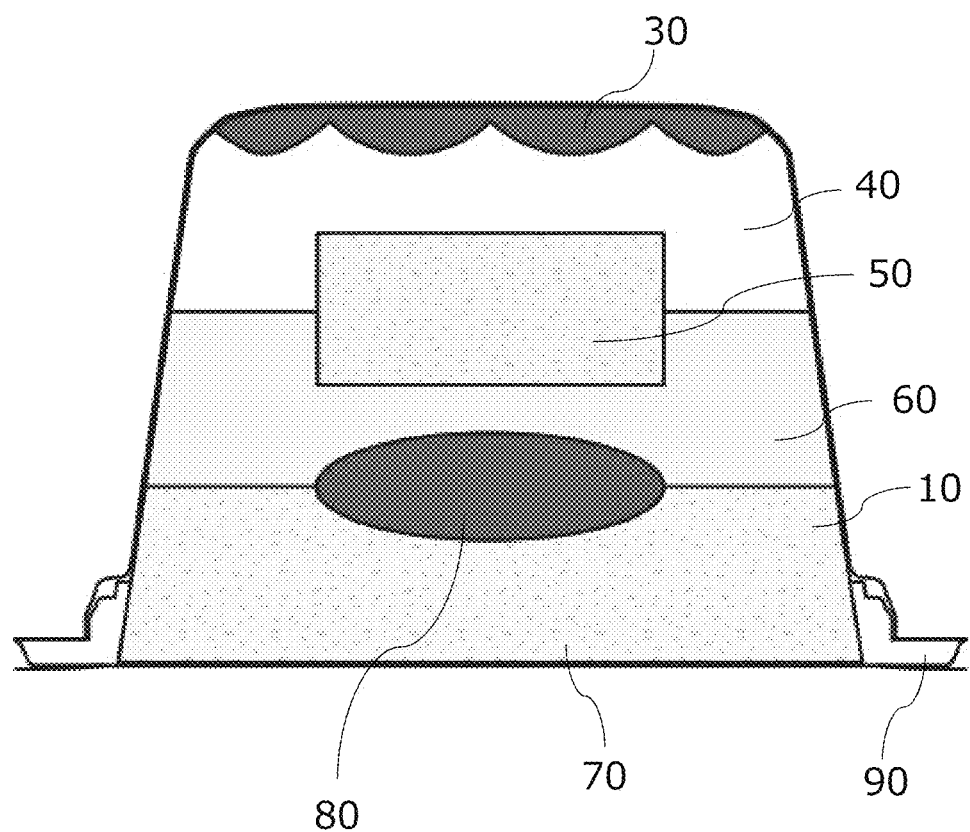

In another preferred embodiment, the source layer 80 may be formed between the second cream layer and the cake platform (that is, a whole cake) with the same source as the first source layer. FIG. 5 (c) and FIG. 6 (c) are photographs showing the actual products of chocolate cake and strawberry cake housed in a package produced by the method of the present invention.

In the present invention, in the first step, the package container shown in FIG. 2 is used as a mold container. The mold container of the present invention is composed of a package container 10 and a bottom lid 90, and has a package container dimension of 127×127×80 mm, a bottom lid dimension of 127×127×11 mm, and a 6-layer shortcake having a total volume of 500 cubic centimeters is manufactured. The package container 10 comprises an opening 11, outwardly tapered side walls 12 and a bottom 13 to form a cake storage space therein. A transparent resin package 10 is used, and in particular the package 10 has an outer taper angle of 5° to 15° with respect to the vertical on its side wall 13 to facilitate removal of the inner cake having a plenty of cream layers from the package 10. The package container 10 has a stepped recess 11a and a reinforcing frame 11b fitted with the convex portion 91 of the bottom lid 90. On the other hand, since the bottom lid 90 is a cake table during post-production storage, the bottom lid 90 is provided with a pedestal portion 91 forming a rectangular plane in the center and recesses 92 surrounding each side of the periphery of the pedestal portion 91. A stepped convex portion frame 93 is formed to protrude so as to surround the recess 92. On the other hand, the convex portion 93 has a horizontal part 94 and a reinforcing rib 95 at the outer periphery thereof and the reinforcing projection 96 is formed at each of the corners. Accordingly, the bottom lid 90 can fit the stepped recess frame into the opening 11 of the package container 10 to hermetically store the inner cake after manufacture of the cake into the package container.

Figure 3B:
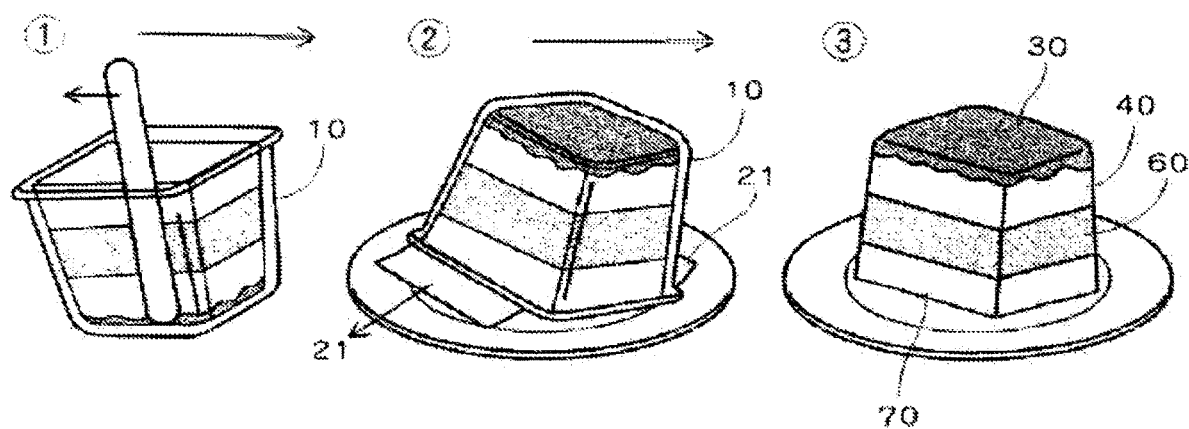
Figure 4A:
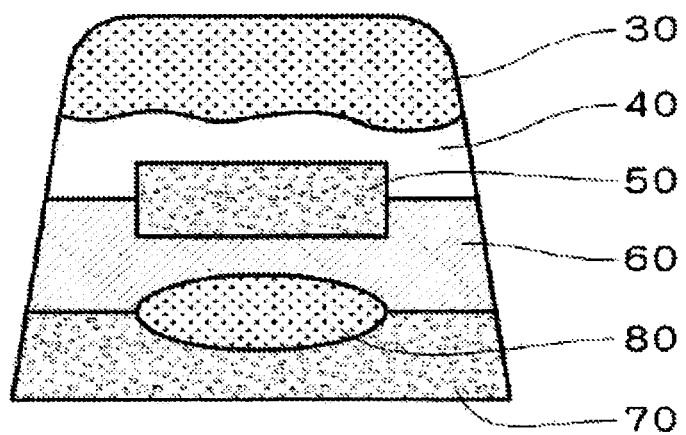
FIG. 4(*a*) is a side view showing a six-layer configuration of the strawberry shortcake.
Figure 4B:
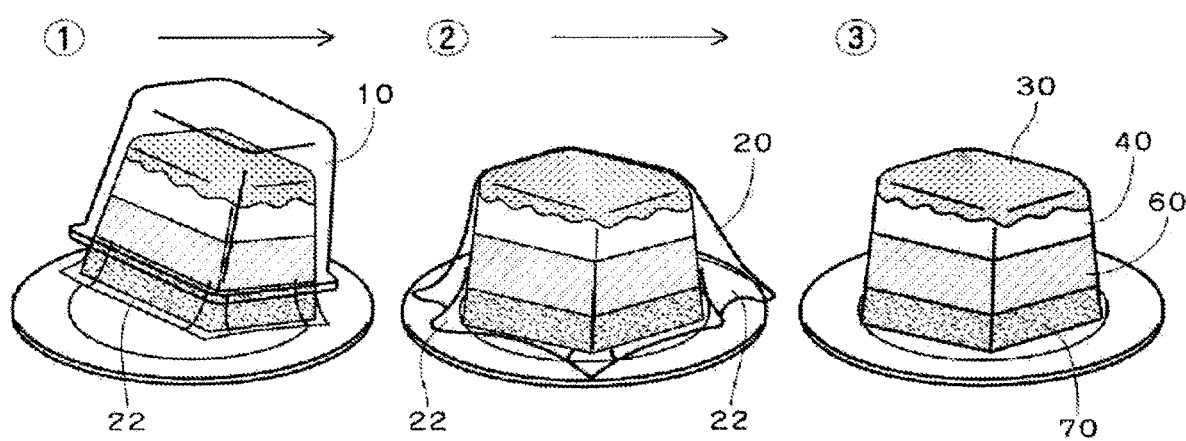

In this package container 10, an insole film 20 is set so that an internally packaged cake does not remain inside the container and can be taken out. As the insole film, the strip-shaped transparent film 20 shown in FIG. 3(b) or the bag-shaped transparent film 22 shown in FIG. 4(b) is used. The strip-shaped film 20 covers the bottom surface 13 of the package container 10 and at least a pair of opposed side walls 12a, 12c, and the film strip has a length such that an end portion 21 thereof protrudes outward from the package opening 11. That is, when the insole film 20 is a belt-shaped film, it is preferable that the width is about 70% to 80% of one side 11a of the bottom surface 11 of the package container 10. The strip covers a pair of side surfaces from the bottom surface of the package container 10, and has a length protruding outward from the top surface of the opening 12. It is important that the bag-like film 22 of FIG. 4 protrudes outwardly from the package opening 11, particularly at the film corner 23, and the ends of the strip-like film 20 and the bag-like film 22 are folded into the inside of the package container 10 and sealed by the bottom lid 90.

In order to carry out the manufacturing method, the assembly line belt or roller conveyor installation shown in FIG. 1 is used. Using this facility, a shortcake composed of more than two layers of cream to stacked can be produced in a flow operation. 100 is a belt conveyor, the start position of the belt conveyor 100 (first position P1) is provided with a unit or robot for supplying a package container 10 of the top open as a cake manufacturing mold. The first position P1 of the belt conveyor is provided with a pressing means P for pushing the transparent film 20 from the upper surface opening 11 of the package container 10 to be pressed therein, a unit for setting the film as an insole on the container inner surface is provided. Therefore, in the second position P2 downstream of the first position P1, the package container 10 in which the insole film 20 is set down. Next, at a third position P3 downstream of the second position P2, a first plurality of nozzles N1 are provided, and a unit for dropping the topping layer 30 of the cake from the upper opening 11 of the package container 10 onto the insole film 20 is provided. Thereafter, at a fourth position P4 downstream of the third position P3, a second plurality of nozzles N2 are provided, and a unit for forming the first cream layer 40 on the topping layer 30 from the upper opening 11 of the package container 10 is provided. In the present invention, a whipped cream is used as the first cream layer 40. One feature of the method of the present invention is the use of a soft 60% whipped one as a whip cream. The specific gravity of the whip cream is 0.55 to 0.6, and the weight of the cream in 1 ml is 0.55 to 0.6 g, and air is subsequently obtained.

Then, at a fifth position P5 downstream from the fourth position P4, a unit or robot for placing a shape retaining sponge dough or sponge cake block 50 on the first cream layer 40 is provided. When the shape retaining sponge dough 50 to be placed on the cream layer 40 is almost half of the area of the cake platform sponge dough 70, the shape retaining function of the cream layer can be provided.

In the present invention, a third plurality of nozzles N3 are provided at a sixth position P6 downstream of the fifth position P5, and a unit or robot for forming the second cream layer 60 on the shape-retaining sponge dough 50 is provided. As shown in FIG. 3, in case of a chocolate shortcake, a custard cream is used for the second cream layer 60 while a chocolate cream is used for the first cream layer. On the other hand, as shown in FIG. 3 in case of a strawberry shortcake, a whip cream is used for the first and the second cream layer.

Thereafter, in the final step, a unit or robot for placing the cake platform or base dough 70 on the second cream layer 60 is provided, but in the sixth position P6 to the seventh position P7 in front thereof, there may be provided a fourth nozzle N4 for forming a strawberry sauce or a chocolate sauce 80 at a corresponding portion of the shape retaining sponge 50. Finally, at an eighth position P8 downstream of the seventh position P7, a unit or robot for placing the cake base fabric 70 on the second cream layer 60 is provided. Thereafter, in the ninth position P9, a unit or robot is provided in which the end portions of the insole films 20, the films 20 are folded back toward the base side, and the bottom lid 90 is fitted into the opening portion of the package container 10. This unit may be arranged outside the belt conveyor.

Figure 3A:
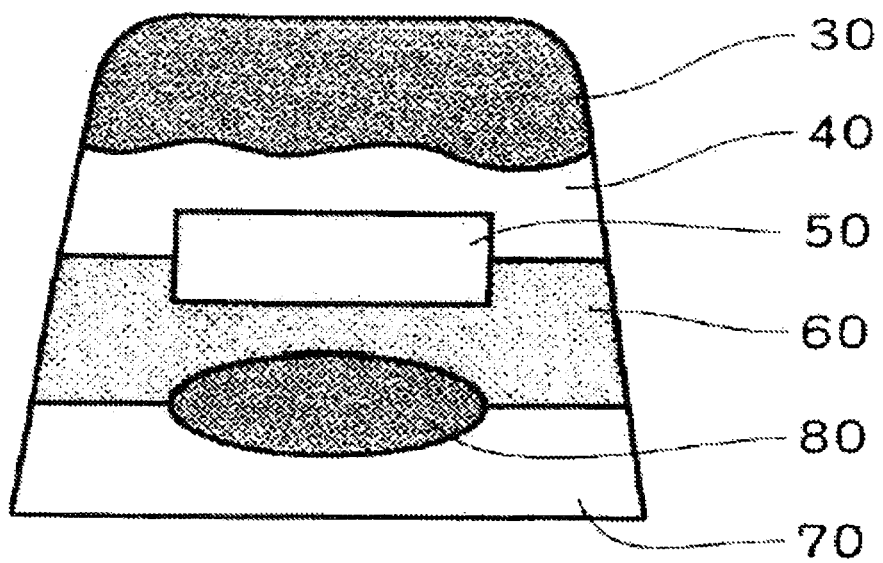
FIG. 3(*a*) is a side view showing a six-layer configuration of the chocolate shortcake.

When the above-mentioned manufacturing method is carried out by the above-mentioned equipment, the package container shown in FIG. 3 is manufactured by laminating the package container with the insole film 21 interposed therebetween. Therefore, a gap is formed between the film-free side surface of the package container 10 and the cup, the package container 10 is floated by drawing out the insoled film 21, the package container is removed, cake can be removed from the package container. This shortcake is shown in cross-section in FIG. 3 (*b*) and consists of six layers: a chocolate sauce layer 30, a whip cream layer 40, a shape-retaining sponge dough 50, a chocolate cream layer 60, a chocolate sauce pool 80, and a sponge base dough 70.

When the above-mentioned manufacturing method is carried out by the above-mentioned facility, a finished product is manufactured by stacking the package container 10 with the bag-like insole film 22 interposed therebetween. As shown in FIG. 4, when the cup is inverted, the cake is removed with the film 22 covering it. Then, when the skirt folds 23 at the four corners of the insole film are pulled and peeled off, the cake is taken out. As shown in FIG. 4B, a shortcake consisting of six layers of a sauce layer 30, a whip cream layer 40, a shape-retaining sponge cake 50, a custard cream layer 60, a sauce pool 80, and a sponge base platform 70 can be taken out. In the case of the above-mentioned bottom cover dimension of 127×127×11 mm and the package container dimension of 127×127×80 mm, a six-layer shortcake consisting of 35 ml of sauce, 121 ml of whip cream, 45 cm$^3$ of dough or, 70 ml of custard cream, 10 ml of sauce, and 90 cm$^3$ of base dough is produced, and a shortcake having a high cream ratio of about 2 to 1 with respect to the ratio of sauce and cream is produced. Image diagrams of packaged chococakes and funnel cakes actually produced according to the present invention are shown in perspective (a) and cross-sectional (b) of FIGS. 5 and 6, and in perspective (c) of the actual product. In the above embodiment, the present invention has been described as an example of an ordinary shortcake, but it goes without saying that the present invention can be applied to an ice cream cake by a person skilled in the art. In this case, a dough table suitable for ice cream, for example biscuit, may be used instead of sponge dough. In addition, in the case of ice cream, it is needless to say that the ice cream is stored frozen and kept in a form as necessary after production, and a person skilled in the art can arrange the configuration of the present invention into an ice cream cake by applying an ice cream technique known or well-known in the art to the present invention.

Effect of the Invention

According to the method of the present invention, it is possible to mass-produce (a) shortcake although it has a large number of steps by means of a flow operation due to the reverse process method from the head to the bottom using a package container as a mold of the manufacturing container, thereby reducing the manufacturing cost. In particular, it should be noted that a shortcake can be made with about twice the amount of sauce and cream for decorating it, relative to the amount of dough or sponge.

In addition, since the shortcake produced by the method of the present invention can be delivered or shipped in a shape-preserved state, so that the shortcake can be sold in a place other than a manufacturing factory or a cake making shop because it will not collapse during the shipment.

Further, the shape-retaining package case is hermetically protected, and the storage property is excellent, thereby taking out the shortcake from the package becomes somewhat problem but since the package container is formed by covering the trapezoidal container 10 having a divergent cross section through the insole film 20, the cake can be easily taken out from the package by pulling out the insole film 20 without adhering to the package container 10. That is, the inner shortcake can be easily taken out from the package container with the end portion 21 of the belt-shaped sheet protruding from the opening 11 of the outer package 10 or the bag-shaped packaging sheet end portion 23. Covering the entire inner circumference of the package and covering the entire circumference of the interior cake with the bag-shaped insole film 22 (FIG. 4) makes it easier to remove the cake.

The take-out process of the shortcake becomes easier by provision with a gap such as an air layer between the outer package 10 and the insole film or the inner cake, so a process of providing a slit as shown in FIG. 3, will be a good way. In this case, the top portion of the outer package 10 may be cut to provide an air blowing port such as open, through which the air may be blown into, if necessary. The formation of an air layer between the outer package and the inner film facilitates removal.

The invention claimed is:

1. A method for manufacturing a shortcake in a package container conveyed by a belt conveyor for mass-production of a packaged shortcake, comprising the steps of:
   1) preparing a package container having a top surface, a bottom surface, and tapered side walls outwardly in an upward direction wherein an area of the bottom surface of the package container is smaller than an area of the top surface of the package container, and the top surface of the package container has an opening;
   2) supplying the package container to the belt conveyor and placing the bottom surface side of the package container on the belt conveyor;
   3) setting an insole film to cover an inner bottom surface of the package container, conveyed by the belt conveyor, wherein the insole film is formed on at least a pair of the tapered side walls facing each other, and both ends of the insole film are extended to an outside of the package container from the opening, so that the insole film is pulled out to take the shortcake out from the package container when eating the shortcake;
   4) forming a topping layer of the shortcake on the insole film covered on the inner bottom surface of the package container conveyed by the belt conveyor;
   5) forming a first cream layer on the topping layer in a manner to cover the topping layer and be spread over the inner bottom surface of the package container conveyed by the belt conveyor;
   6) placing a cake block having a smaller area than that of the first cream layer in a manner to be attached on the first cream layer in the package container conveyed by the belt conveyor;
   7) forming a second cream layer on the cake block to cover and sandwich the cake block with the first cream layer, and a part of the second cream layer is directly laminated on the first cream layer wherein the cake block is placed between the first cream layer and the second cream layer to avoid deformation of the first and second cream layers in the package container conveyed by the belt conveyor;
   8) placing a cake platform on the second cream layer in a manner to cover all of the second cream layer in the package container conveyed by the belt conveyor wherein the shortcake is produced in an order from the topping layer to the cake platform in Steps 4) to 8) called reverse process;
   9) covering the cake platform by separately folding each end of the insole film extended to the outside of the package container, conveyed by the belt conveyor, from the opening in Step 3) of setting,
   10) sealing the opening of the top surface of the package container, conveyed by the belt conveyor, by a bottom lid in a manner to support all of the shortcake;
   11) flipping the package container upside down to place the topping layer on top of the shortcake and the cake platform on the bottom of the shortcake which are produced in Steps 4) to 8) By the reverse process; and
   12) performing the mass-production of the packaged shortcake.

2. The method according to claim 1, further comprising: a source pool layer formed between the second cream layer and the cake platform as a source layer in the package container conveyed by the belt conveyor.

3. The method according to claim 1, wherein when the topping layer is sauce, the first cream layer is a soft 60% whipped cream while the second cream is a custard cream.

4. The method according to claim 1, wherein when the topping layer is chocolate sauce, the first cream layer is a soft 60% whipped cream, while the second cream is a chocolate cream.

5. The method according to claim 1, wherein the package container is made of a transparent resin.

6. The method according to claim 1 wherein the insole film has a rectangular shape, covering the bottom surface of the package container and at least a pair of the tapered side walls, the both ends of the insole film which come out from the package opening for cake removal.

7. The method according to claim 1, wherein a size of the cake block is approximately half the area of the cake platform.

8. The method according to the claim 1, wherein the package container has a stepped recess and a reinforcing frame which have a tapered outer opening angle of 5° to 10° with respect to a vertical line on its side wall and fits with a convex portion of the bottom lid in the top opening.

9. The method according to the claim 1, wherein the insole film is a strip having a width of about 70% to 80% of one side of the bottom surface of the package container, and a length covering a pair of side surfaces from the bottom surface of the package container and protruding outward from the top opening.

* * * * *